UNITED STATES PATENT OFFICE.

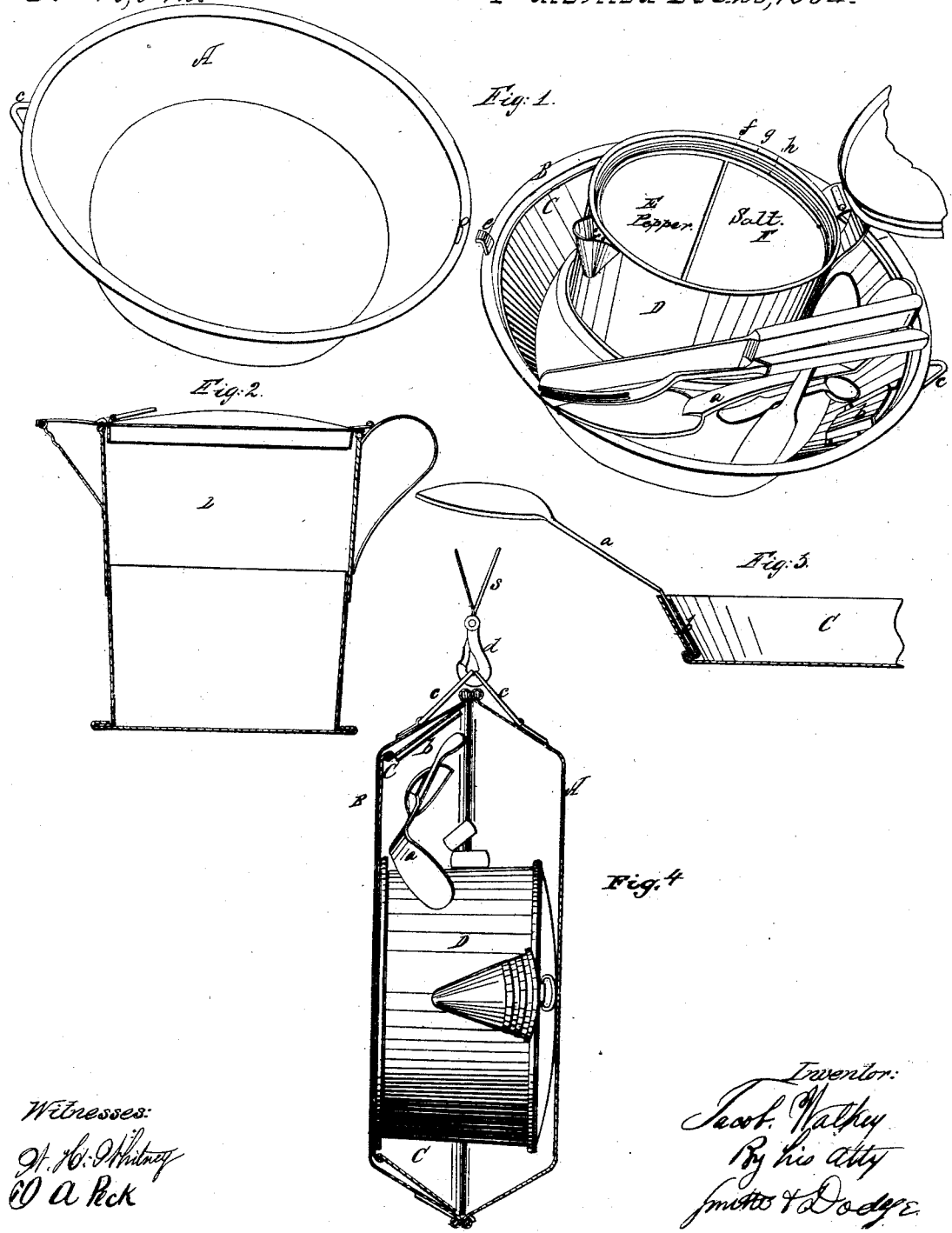

JACOB WALKEY, OF MONROE, WISCONSIN.

IMPROVED CAMP-KIT.

Specification forming part of Letters Patent No. 45,542, dated December 20, 1864.

*To all whom it may concern:*

Be it known that I, JACOB WALKEY, of Monroe, Green county, in the State of Wisconsin, have made certain new and useful improvements in cooking utensils for the use of soldiers, hunters, and others, who are compelled to travel; and I do hereby declare that the following is a full, clear, and exact description thereof, reference being had to the accompanying drawings, making part of this specification, and to the letters of reference thereon, in which—

Figure 1 is a perspective view of the case open, with the smaller utensils packed ready for closing the case for transportation. Fig. 2 is a vertical transverse section of the coffee-pot to be used in connection with the case. Fig. 3 is a similar view of a portion of the frying-pan with the handle attached; and Fig. 4 is a sectional view of the case closed and slung for transportation, with its contents inclosed The nature of my invention consists in a novel construction and arrangement of such cooking and eating utensils as may be necessary for a soldier or other person on a march, whereby I am enabled to pack them in a very compact form, occupying but a small space, and at the same time secure them against loss and render them easy of transportation.

To enable others skilled in the art to construct and use my invention, I will proceed to describe it more minutely.

A and B represent two metal plates, which may be stamped from sheet-tin, in the usual manner. To one of these is riveted or otherwise secured a projecting piece, $e$, as shown in Figs. 1 and 4, in which it is represented as fastened to plate B. In the other plate, A, is made a small hole (shown at $o$, Fig. 1.) To the opposite side of each plate is then secured a metal loop, $c$, which, as shown in Fig. 4, may be hinged to a small piece of sheet metal riveted thereon. The projection $e$ being inserted in the hole, $o$ the two plates A and B are then turned with their faces or concave surfaces toward each other, in which position they may be secured by pressing the spring-hook $d$ through the two loops $c$, as shown in Fig. 4, thus forming a case in which to pack the remainder of the utensils.

C represents a frying-pan, made of such a size as to fit snugly within one of the plates. This pan has no permanent handle, but, instead, is provided with a metallic loop, $b$, into which a detachable handle may be inserted when needed for use.

D represents a coffee-pot, which is constructed of two sections, the lower section sliding within the upper one, as shown in Fig. 2; the object of this peculiar construction of the body, being for the purpose of enabling the coffee-pot to be drawn out, as shown, so as to hold the required quantity of coffee, and at the same time permit its being reduced in height, so that when not in use it can be inclosed within the case, as shown in Fig. 4. It should be made with a copper bottom, securely fastened, so as to avoid danger of its becoming loosened by the heat. It should also have a cover with a hinged lip shutting over the nose, to keep out ashes, smoke, &c.

Three (more or less) cups, $f$, $g$, and $h$, are then provided, of such size as to fit one within the other, the whole fitting snugly within the coffee-pot D, as shown in Fig. 1. Within the smaller of these cups are fitted two boxes, E and F, having removable lids or covers, and made of such size and form as to just fill the space within the cup. One of these, intended for pepper, is provided with a second cover underneath the first, perforated in the usual manner. The cups $f$, $g$, and $h$ may be provided with handles, which can be turned over on the inside of the cup, or that can be detached entirely, for convenience in packing them, and the smaller one, to be used as a receptacle for sugar, may have a cover, if desired.

A strong metal spoon, $a$, is then provided, with the handle bent, as shown in Fig. 3, for the purpose of permitting it to be inserted in the loop $b$ of the frying-pan C, and thereby forming a handle for the same, as clearly shown in said figure.

A knife and fork, together with one or more smaller spoons, are added, which completes the list of utensils, though more may be added, if desired.

The operation of packing them is as follows: One of the plates—for instance, B—is placed horizontally, and the frying-pan C placed within it, a piece of cloth or paper, or a little grass, hay, or other similar substance being interposed, if desired. The coffee-pot D is then reduced in height by shoving the lower section up within the upper one, when it is placed in the frying-pan, as near one side as possible, as shown in Fig. 1. The cups $f$, $g$, and $h$, after being placed one within the other, are then set in the coffee-pot, and the boxes E and F placed within them and the cover of the coffee-pot shut down. The spoon $a$ is then laid in by the side of the coffee-pot D, the smaller spoons then laid in, the knife laid with its blade vertical, as shown, and the fork laid close along side of it. When all are thus placed in position, the plate A is taken up and united to B by hooking it onto $e$, when it is turned over upon B and secured by means of the hook $d$, being passed through the loops $c$, as previously described, thus securing the whole together in a most compact and perfect manner. It is obvious that, if desired, one of the plates may be dispensed with and the frying-pan used instead to form one side of the case, but that would lessen the number of dishes, and would bring the black or soiled surface of the pan in contact with the clothing in marching, which would be objectionable.

By this construction and arrangement I am enabled to furnish a complete set of cooking and eating utensils, sufficient for the use of the soldier, hunter, tourist, &c., and all occupying but little or no more space than an ordinary canteen, and which can be carried in the same manner, and with no more trouble than a canteen, by simply attaching a strap, $s$, to the hook $d$.

Having thus described my invention, what I claim as new, and desire to secure by Letters Patent, is—

1. Constructing a packing-case by the union of the plates A and B, substantially as and for the purpose set forth.

2. Forming a handle for the frying-pan C by means of the spoon $a$, substantially as set forth.

3. In combination with the packing-case, constructed as shown, the coffee-pot, cups, boxes, and other articles, substantially as shown and described.

JACOB WALKEY.

Witnesses:
W. C. DODGE,
R. D. O. SMITH.